CHANNEL GUIDE AND POLYROD
PRIMARY AMPLITUDE DISTRIBUTION

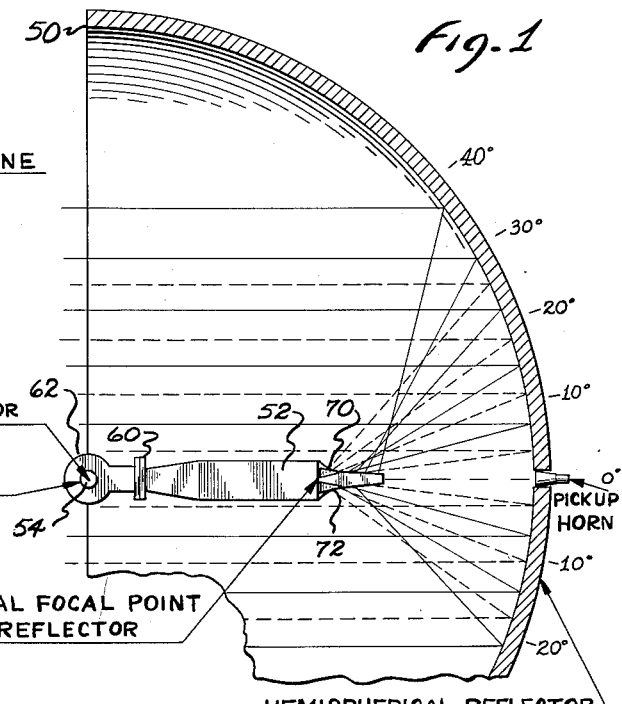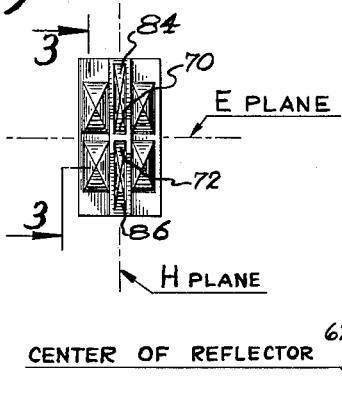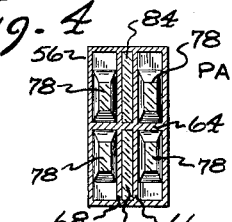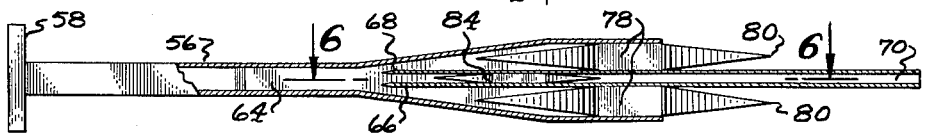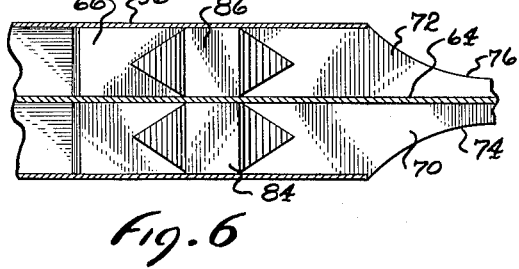

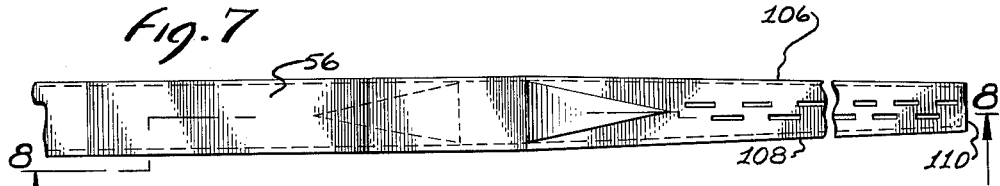
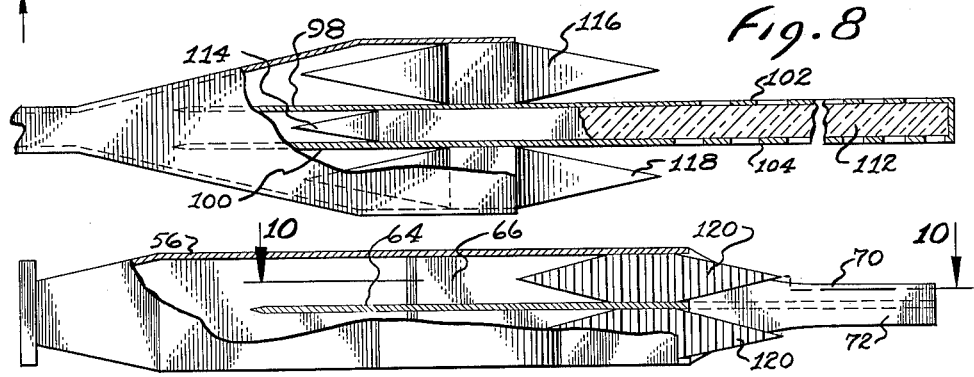
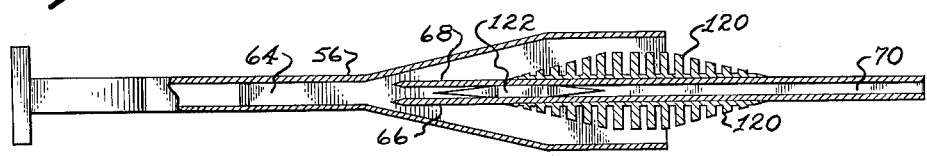
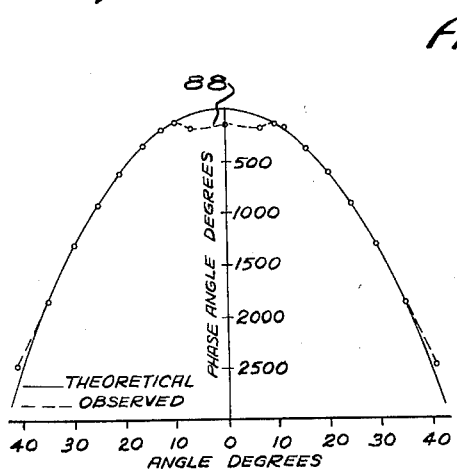
DOUBLE CHANNEL GUIDE PHASE OVER AREA OF REFLECTOR
Fig. 11
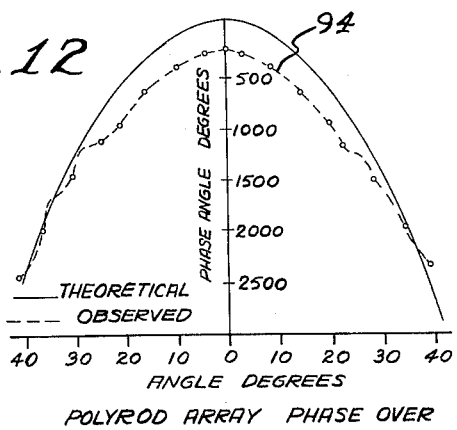
POLYROD ARRAY PHASE OVER AREA OF REFLECTOR
INVENTOR.
ALLAN W. LOVE
BY
Wm. H. Dean
AGENT

COMPOSITE ILLUMINATOR
PRIMARY AMPLITUDE DISTRIBUTION

COMPOSITE ILLUMINATOR PHASE
OVER AREA OF REFLECTOR

←EAST   AZIMUTH ANGLE DEGREES   WEST→
SECONDARY PATTERN IN E PLANE

←EAST   AZIMUTH ANGLE DEGREES   WEST→
SECONDARY PATTERN IN H PLANE

INVENTOR.
ALLAN W. LOVE
BY
*Wm. H. Dean*
AGENT

2,997,711
SPHERICAL REFLECTOR AND COMPOSITE ILLUMINATOR

Allan W. Love, Phoenix, Ariz., assignor to Wiley Electronics Company, a corporation of Arizona
Filed May 22, 1959, Ser. No. 815,131
13 Claims. (Cl. 343—762)

The present invention relates to a spherical reflector and composite illuminator therefor and more particularly to a spherical reflector and composite illuminator therefor which may be used as a directional antenna.

Heretofore, spherical reflectors have not been widely used in antennas due to spherical aberration, consequently paraboloidal reflectors have been most commonly used.

It is recognized that a spherical reflector has many advantages over a paraboloidal reflector as follows: A spherical reflector is easier to construct and to maintain within the required dimensional tolerances than is a paraboloidal reflector. It is possible to scan a secondary antenna beam in two mutually perpendicular planes, without movement of the spherical reflector. Such scanning is accomplished by rotation of the antenna illuminator element about the center of the spherical reflector. This is a distinct advantage when very large reflectors are constructed to obtain a large effective antenna aperture. For example, an antenna aperture measuring several hundred feet could be maintained in stationary position when provided by a spherical reflecting surface, whereas the entire structure of a paraboloidal reflector would have to be moved in order to accomplish scanning.

It will be appreciated by those skilled in the art that the problems involved definitely favor a spherical reflector, relative to a paraboloidal reflector, when thermal stability of the structure of large dimensions presents an arrangement which is difficult to construct, motivate and maintain.

When utilizing a spherical reflector, for example, scan angles of 110 degrees in either plane are possible by moving an illuminator having a primary illumination pattern covering a portion of the spherical reflector which subtends an angle of 70 degrees at the center of the sphere; it being assumed that a full hemispherical reflecting surface is used.

When using the spherical reflector the primary or incident illumination pattern can be shaped to provide an excellent approach to a cosine-squared power distribution, resulting in very low side lobe levels in the secondary or reflected antenna beam.

Prior art devices have not been successful in the utilization of spherical reflectors to reflect true pencil shaped beams due to the fact that prior art illuminators for such reflectors have been unsymmetrical devices which are wasteful of antenna aperture and produce primary patterns resulting in reflected beams having approximately twice the width in one major plane as in the other.

One example of such a prior art device is a heimspherical reflector having an illuminator consisting of a channel guide while another such prior art device utilizes a pair of channel guides back to back. It has been found however that such channel guides in back to back relationship do not provide a satisfactory illuminator for a spherical reflector. A pair of channel guides so arranged create only two separate centers of illumination on a spherical reflecting surface giving rise to a two element interferometer. Consequently the secondary or reflected pattern is equal only to that produced by either channel guide alone, multiplied by the interferometer or array factor appropriate to the spacing which exists between the two channel guides or centers of illumination. The result being that in the plane passing through the center of the sphere and containing the two centers of illumination, the secondary or reflected pattern possesses large interferometer lobes very close to the main beam and only slightly lower in amplitude.

It has been established however that the double channel guide comprising two channel guides back to back does provide an illuminator which corrects for spherical aberration.

While the foregoing prior art devices are known to correct for spherical aberration it is obvious that the interferometer effect cannot be tolerated when it is desired to utilize a large effective antenna aperture to produce a pencil shaped reflected beam having very low side lobe levels.

Accordingly, it is an object of the present invention to provide a spherical reflector and composite illuminator therefor which provides a true pencil shaped reflected beam with very low side lobe levels.

Another object of the invention is to provide a composite illuminator for a spherical reflector wherein an array of line source elements corrects for spherical aberration of the reflector outwardly of its paraxial region and wherein an array of point source means illuminates the paraxial region of the reflector whereby illumination from the line source element is in proper phase outwardly of the paraxial region and at high amplitude while the illumination from the point source means is in phase at the paraxial region of the reflector and at high amplitude therein resulting in a composite illumination of a large aperture of the reflector in proper phase and with substantially smooth amplitude distribution.

Another object of the invention is to provide a composite illuminator for spherical reflectors wherein an array of line source elements and an array of point source means are supported by a wave guide which is movable relative to a spherical reflector providing a reflector illuminator which is very compact and readily movable for scanning operations during stationary disposition of the spherical reflector.

Another object of the invention is to provide a composite illuminator for spherical reflectors wherein an array of line source elements and an array of point source means all have a composite focal point disposed to coincide with the paraxial focal point of a spherical reflector.

Another object of the invention is to provide a composite illuminator for spherical reflectors wherein various equivalents may be used for line source elements and point source means.

Another object of the invention is to provide a composite illuminator for spherical reflectors wherein a wave guide supports an array of line source elements and an array of point source means and wherein power divider partitions are placed in the wave guide to provide any desired division of power between the line source elements and the point source means.

A further object of the invention is to provide a composite illuminator for spherical reflectors wherein an array of line source elements and an array of point source means are caused to function in proper relation to each other by means of a phase shifting device placed in a wave guide feed to one of the arrays.

Further objects and advantages of the present invention may be apparent from the following specification, appended claims and accompanying drawings in which:

FIG. 1 is a fragmentary sectional view of a hemispherical reflector showing a composite illuminator of the invention pivotally mounted relative to the center of the hemispherical reflector.

FIG. 2 is an enlarged end view of the composite illuminator shown in FIG. 1 taken from the end thereof which is directed toward the reflector.

FIG. 3 is a partial sectional view taken from the line 3—3 of FIG. 2.

FIG. 4 is a transverse sectional view of the composite reflector taken from the line 4—4 of FIG. 3.

FIG. 5 is a sectional view of the composite reflector taken from the line 5—5 of FIG. 3.

FIG. 6 is a fragmentary sectional view taken from the line 6—6 of FIG. 5.

FIG. 7 is a fragmentary elevational view of a modified form of composite illuminator in accordance with the present invention.

FIG. 8 is a sectional view taken from the line 8—8 of FIG. 7.

FIG. 9 is a side elevational view of a further modified form of composite illuminator in accordance with the present invention showing portions thereof broken away and in section to amplify the illustration.

FIG. 10 is a sectional view taken from the line 10—10 of FIG. 9.

FIG. 11 is a graphic illustration of the phase functions of channel guide line source elements over an area of a spherical reflector.

FIG. 12 is a graphic illustration of the phase functions of polyrod point source means over an area of a spherical reflector.

Figure 13:
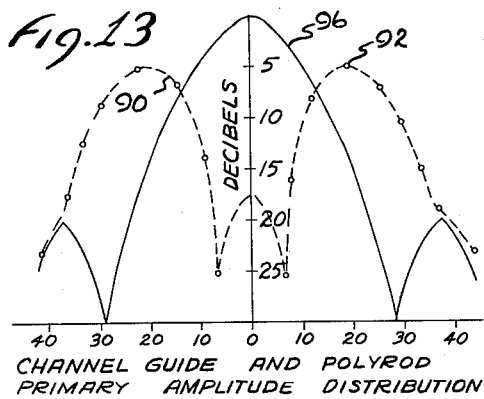
FIG. 13 is a graphic view of the primary amplitude distribution of both the line source elements and the point source means of the composite illuminator of the present invention.

The term "line source" as used herein defines a means or element which is capable of functioning as an antenna illuminator to correct for spherical aberration of a spherical reflecting surface.

The term "line source" is construed to include slotted wave guides, channel shaped wave guides, arrays of dipoles fed from a wave guide or having corporate feeds and other equivalent devices.

The term "point source" as used herein defines a means or element which is capable of functioning as an antenna illuminator to illuminate a paraxial region of a spherical reflector.

The term "point source" is construed to include arrays of polyrods, ferrite radiators, helices, corrugated slow wave radiating structures, horns, and dipoles or other equivalent elements or devices, providing such arrays possess a common center of radiation.

As shown in FIG. 1 of the drawings the invention comprises a hemispherical reflector 50 and a composite illuminator 52 which is provided with a pivotal mount 54 having its axis located at the center of the hemispherical reflector 50.

The composite illuminator 52 is provided with a hollow casing 56 which is generally rectangular in cross section as shown in FIG. 4 of the drawings and this casing 56 is provided with a conventional wave guide coupling flange 58 which is bolted or otherwise secured to a hub flange 60 carried by a hub 62 which is mounted on the pivotal support 54. It will be understood that the pivotal mounting 54 may be any desired pivotal mounting which will permit the composite illuminator 52 to pivot about the center of the reflector in various directions. Thus, the pivotal support may be arranged to permit movement of the composite illuminator 52 in both the E plane and the H plane as shown in FIG. 2 of the drawings.

The wave guide casing is provided with an H plane power divider partition 64 which intersects a pair of spaced E plane power divider partitions 66 and 68 shown best in FIG. 4 of the drawings. The E plane power divider partitions 66 and 68 divide the wave guide casing 56 into three sections while the H plane power divider 64 divides each of said three sections into a pair of sections.

Communicating with the sections between the E plane power divider partitions 68 and 66 are channel shaped wave guide extensions 70 and 72 of the wave guide casing 56. These channel guide extensions 70 and 72 communicate with the central sections on opposite sides of the H plane power divider partition 64 and are provided with contoured side walls 74 and 76, respectively, in order to emit radiation at various angles along the contoured length, while maintaining all of the illumination disposed at varying angles in the correct phase. Thus, the contoured channel guides 70 and 72 are disposed to compensate for spherical aberration of the hemispherical reflector 50 and the illumination relative to the channel guides 70 and 72 is shown by solid lines in FIG. 1 of the the drawings.

Tapered polyrods 78 are disposed in the outermost sections of the wave guide casing 56 outwardly of the E plane power divider partition 66 and 68 and the ends 80 of these polyrods are disposed approximately one half a wave length apart.

As shown in FIG. 3 of the drawings the polyrods 78 are tapered at both ends in one case to achieve matching whereby reflection is reduced to a minimum and in the other case to emit radiation or vice versa. Opposite ends of the polyrod 78 are substantially pyramidal in shape. At a location 82 between the base portions of the pyramidal ends which project from the casing 56 these polyrods have a common center of illumination which is disposed to coincide with the paraxial focal point of the reflector 50 as shown in FIG. 1 of the drawings. The channel guides 70 and 72 are also disposed so that the effective phase focus of their illumination coincides with the paraxial focal point of the reflector at the location 82 as shown in FIG. 3 of the drawings.

Located in the central sections of the wave guide casing 56 between the E plane power divider partition 66 and 68 are phase shifter wedges 84 and 86. These wedges are made of dielectric material and are provided with tapered ends to achieve matching. These phase shifting wedges 84 and 86 are disposed in the feed to the channel guides 70 and 72 in order to attain a desired phase relationship between the function of the polyrods 78 and the channel guides 70 and 72.

The E plane power divider partitions 66 and 68 as shown in FIG. 5 of the drawings are so arranged that half of the power transmitted by the wave guide casing 56 is fed to the channel guides 70 and 72, between the power divider partition 66 and 68, while the remaining half of the power transmitted by the casing 56 is fed to the polyrods 80. Due to the disposition of the H plane power divider partition 64 the amount of power which is fed to the polyrods is equally divided between all of them. The foregoing division of power between the polyrods and the channel guides permits the amplitude of illumination from the channel guides to be equal to that accommodated by the polyrods in order to provide a distribution over the aperture of the reflector 50 as will be hereinafter described in detail. The foregoing division of power between the polyrods and the channel guides results in a smoothly tapered distribution of primary or incident amplitude over the aperture of the reflector 50 as will be hereinafter described in detail.

The power divider partitions as disclosed herein may be disposed to provide an unequal division of power between the line source elements and the points source means if necessary or desirable.

Operation of the present invention is substantially as follows:

With reference to FIGS. 1 and 11 it will be seen that the channel guides 70 and 72 radiate in close proximity to the theoretical curve shown by solid line. It will be noted however that the channel guides do not function in phase in the paraxial region of the reflector 50 for approximately ten degrees about the paraxial center of the reflector.

With reference to FIG. 13 it will be seen that the amplitude of the illumination by the channel guides 70 and 72 in this same paraxial region is quite low. The secondary lobe of low illumination by the channel guides being shown at 86 in FIG. 13 and corresponding with the phase shown at 88 in FIG. 11. It will be appreciated that in the paraxial region the channel guides 70 and 72 illuminate slightly out of phase but the amplitude thereof is quite low. Main lobes 90 and 92 of the channel guide illumination outwardly of the paraxial region of the reflector 50 attain considerably greater amplitude than in the paraxial region at 86.

Referring now to FIGS. 1 and 12 of the drawings it will be seen that the polyrods 78 illuminate the reflector in the paraxial region on a curve at 94 which very closely approximates the theoretical curve shown in solid lines in both FIGS. 11 and 12. It will be noted however that the illumination by the polyrods 78 is substantially 270 degrees out of phase with the theoretical cures of FIGS. 11 and 12. The phase shifting wedges disclosed in FIGS. 3 to 6, inclusive, of the drawings serve to correlate the illumination curve 94 of the polyrods with the solid line theoretical curves of FIGS. 11 and 12 thereby providing a composite curve shown in FIG. 15 wherein the phase of the composite illuminator directly coincides with the theoretical curve for about 35 degrees in each direction from the center of the paraxial region of the reflector 50.

As shown in FIG. 12 of the drawings the phase of illumination by the polyrods 78 departs from the theoretical curve at approximately 25 degrees from the paraxial center of the reflector when the curve at 94 is made to coincide with the theoretical curve by providing a phase shift of 270 degrees between illumination emitted by the channel guides 70 and 72 and the polyrods 78. Thus, illumination by the polyrods is considerably out of phase beyond 25 degrees from the paraxial center of the reflector. However, with reference to FIG. 13 it will be seen that the amplitude of illumination by the polyrods as exemplified by the curve 96 is considerably lower than illumination by the channel guides at an angle of 25 degrees from the paraxial center of the reflector. Even though illumination by the polyrods 78 is out of phase beyond 25 degrees from the paraxial center of the reflector the amplitude of this illumination is so low that it is completely dominated by the radiation from the channel guides represented by the curves 90 and 92.

Figure 15:
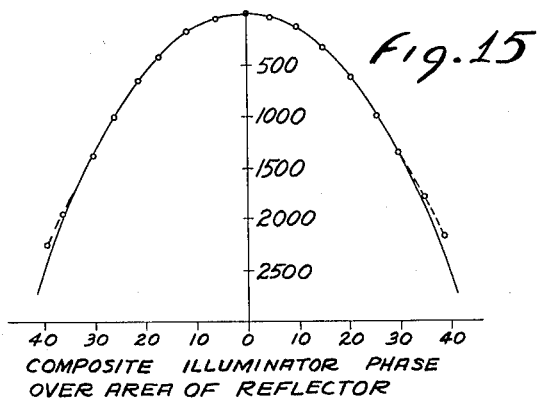
FIG. 15 is a graphic illustration of the phase functions of the composite illuminator over an area of a spherical reflector.

Illumination by the channel guides is out of phase at the paraxial center of the reflector while its amplitude is very low and is dominated by the high amplitude of the illumination by the polyrods which is in proper phase at the paraxial center of the reflector. This, of course, takes into consideration the fixed phase shift of 270 degrees provided by the wedges 86 and 84 which place the phase of both the channel guides 70 and 72 and the polyrods 78 in coincidence with the theoretical curve as shown in FIG. 15. Thus, the composite illuminator illuminates in proper phase throughout an included angle of approximately 70 degrees of the aperture of the reflector 50.

Figure 14:
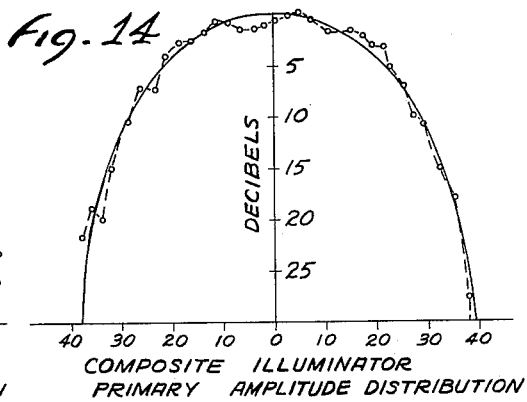
FIG. 14 is a graphic illustration of primary amplitude distribution of the composite illuminator of the present invention combining the functions of both line source elements and point source means.

Attention is called to a comparison of the curves disclosed in FIGS. 13 and 14 wherein FIG. 13 illustrates a comparison of the primary amplitude distribution of both the channel guides 70 and 72 relative to that of the polyrods. In FIG. 14 the composite primary amplitude distribution is shown by broken lines with relation to a theoretical curve disclosed by a solid line. Thus, the composite illumination amplitude afforded by the channel guides and the polyrods is quite continuous throughout an included angle of over 70 degrees of the reflector aperture. The theoretical curve disclosed by a solid line in FIG. 14 is actually one in which primary illumination amplitude over the aperture is tapered so as to vary as the cosine of the aperture angle. It will be appreciated by those skilled in the art that such tapering of primary illumination is necessary in order to obtain low side lobe levels in the secondary or reflected antenna beam. It will also be appreciated that it is possible to approximate tapered illumination functions other than the cosine relation shown by the solid line in FIG. 14, by appropriate changes in the E plane power dividers 66 and 68 which regulate the relative amounts of power fed to the channel guides and the polyrods.

With reference to FIGS. 14 and 15 it will be seen that the composite illuminator comprising the channel guides and the polyrods illuminates continuously and in phase throughout at least an included angle of 70 degrees about the paraxial center of the reflector 50.

The curves disclosed in FIGS. 11 to 15, inclusive, were plotted by experimentation utilizing a small pickup horn at the paraxial center of the reflector as shown in FIG. 1 of the drawings. The composite illuminator 52 was pivoted up to and including 40 degrees in each direction from the pickup horn and the phase and amplitude relationships disclosed were actually obtained.

Figure 17:
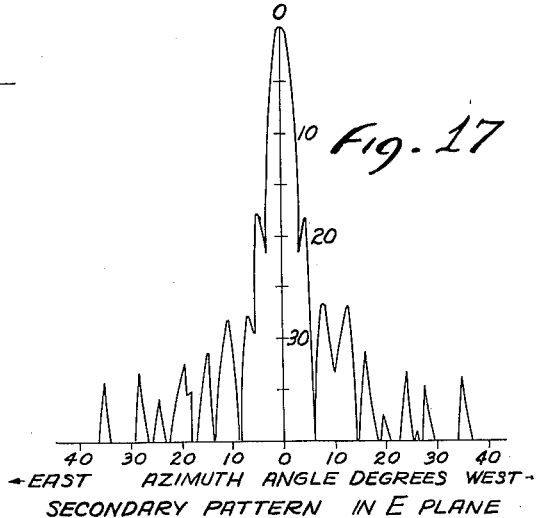
FIG. 17 is a graphic illustration of a secondary or reflected beam in a plane at right angles to that shown in FIG. 16.
Figure 16:
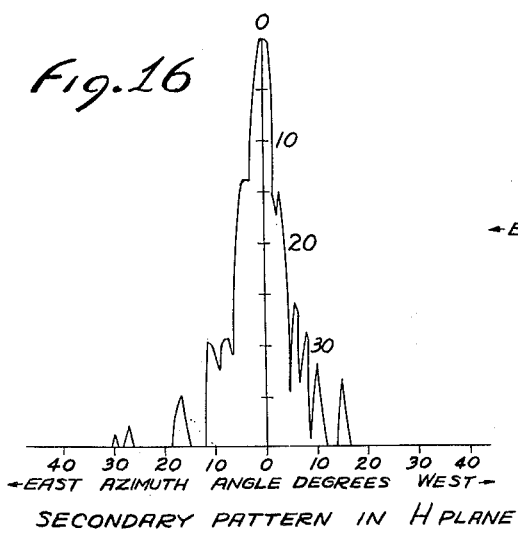
FIG. 16 is a graphic illustration of the secondary or reflected pattern of a pencil shaped beam in one plane.

In FIGS. 16 and 17 true pencil shaped secondary beams are disclosed and these beams were reflected from the spherical reflector of the present invention into the far field area commonly known as the Fraunhofer zone at which distance measurements were made to obtain the graphic illustrations shown in these FIGS. 16 and 17. It will be noted that these figures were plotted with relation to the H and E planes identified in FIG. 2 of the drawings.

In the foregoing description of the structure shown in FIGS. 1 to 6 of the drawings the polyrods 78 in accordance with the present invention are termed point sources and the channel guides 70 and 72 are termed line sources.

In the modification of the present invention shown in FIGS. 7 and 8 of the drawings the wave guide casing 56 is provided with a pair of E plane power divider partitions 98 and 100 which extend to the illuminating end of the illuminator and form sides 102 and 104 of a slotted guide which provides a line source in accordance with the present invention.

These sides 102 and 104 are connected by sides 106 and 108 to form a substantially rectangular in cross section tubular structure. This tubular structure is tapered from the wave guide casing 56 in a converging relationship toward the end 110 of the slotted guide.

This slotted guide is filled with a dielectric material 112 and the tapered structure of the slotted guide thus provides a varying effective dielectric constant due to the tapered cross section of the material 112 which fills the slotted guide. This material between the power divider partitions 98 and 100 is provided with a tapered end 114 for matching purposes.

Outwardly of the partitions 98 and 100 are polyrods 116 and 118 which serve as point source elements and function in a similar manner to the hereinbefore described polyrods 78. Thus, in the modified structure shown in FIGS. 7 and 8 the slotted guide functions as a line source means to compensate for spherical aberration outwardly of the paraxial region of the reflector 50 while the polyrods 116 and 118 function as point source means to accommodate illumination at the paraxial region of the reflector.

In the modification as shown in FIGS. 9 and 10 of the drawings the wave guide casing 56 is similar to that shown in FIG. 3 of the drawings and the E and H plane power divider partitions are similar to those shown in FIGS. 2 and 4 of the drawings. The channel guides 70 and 72 are similar to those shown in FIG. 3 of the drawings.

The point source means shown in FIGS. 9 and 10 of the drawings comprises four corrugated slow wave radiating structures 120 which are located in substantially the same locations as the polyrod structures shown in FIGS. 3 and 4 of the drawings. These corrugated slow wave radiating structures are tapered at both ends as shown in FIG. 9 of the drawings and are provided with flat sides contiguous with the E plane power divider partition 66 and 68. The corrugations of these slow wave radiating structures 120 are gradually stepped from each end toward the middle thereof so that the lowest corrugations are near opposite ends of these point source devices 120.

As shown in FIG. 10 of the drawings phase shifting wedge structure 122 is disposed between the E plane power divider partition 66 and 68 in a similar fashion to the disposition of the wedges 84 and 86 shown in FIGS. 5 and 6 of the drawings. It will be herein noted that these wedges may be designed to accomplish a phase shift equalling any number of degrees between zero and 360 in order to achieve a proper phase relationship between the functions of the point source means and the line source means of the composite illuminator.

It will be obvious to those skilled in the art that the antenna of the present invention which comprises a spherical reflector and a composite illuminator containing a point source means and a line source means may be used for receiving or transmitting as desired and that terms appropriate to the structure used for one purpose may be considered analogous or equivalent to the structure used for the other purpose.

It will be further obvious to those skilled in the art that various modifications of the present invention may be resorted to in a manner limited only by a just interpretation of the following claims.

I claim:

1. In a spherical reflector and composite illuminator therefor the combination of: a spherical reflector; first means for supporting source means in the proximity of the paraxial focal point of said reflector, a line source means supported by said first means in alignment with said paraxial focal point and disposed to correct for spherical aberration of said reflector outwardly of its paraxial region; and a plurality of point sources supported by said first means in symmetrically spaced relation to said paraxial focal point and having a common center coinciding therewith.

2. In a spherical reflector and composite illuminator therefor the combination of: a spherical reflector; first means for supporting source means in the proximity of the paraxial focal point of said reflector, a line source means supported by said first means in alignment with said paraxial focal point and disposed to correct for spherical abberation of said reflector outwardly of its paraxial region; and a plurality of point sources supported by said first means and having a common center coinciding with said paraxial focal point to dominate the function of illumination in the paraxial region of said reflector.

3. In a spherical reflector and composite illuminator therefor the combination of: a spherical reflector; first means for supporting source means in the proximity of the paraxial focal point of said reflector, a line source means supported by said first means in alignment with said paraxial focal point and disposed to correct for spherical aberration of said reflector outwardly of its paraxial region; and a plurality of point sources supported by said first means in symmetrically spaced relation to said paraxial focal point and having a common center coinciding therewith, said point sources being spaced apart approximately one half a wave length.

4. In a spherical reflector and composite illuminator therefor the combination of: a spherical reflector; first means for supporting source means in the proximity of the paraxial focal point of said reflector; a line source means supported by said first means in alignment with said paraxial focal point and disposed to correct for spherical aberration of said reflector outwardly of its paraxial region; and a plurality of point sources supported by said first means in symmetrically spaced relation to said paraxial focal point and having a common center coinciding therewith, said point sources being spaced apart approximately one half a wave length, said point sources being tapered polyrods and said line source means being a channel guide extension of said first means.

5. In a spherical reflector and composite illuminator therefor the combination of: a spherical reflector; first means for supporting source means in the proximity of the paraxial focal point of said reflector; a line source means supported by said first means in alignment with said paraxial focal point and disposed to correct for spherical aberration of said reflector outwardly of its paraxial region; and a plurality of point sources supported by said first means in symmetrically spaced relation to said paraxial focal point and having a common center coinciding therewith; a wave guide coupled with said line source means and said point sources; and a dielectric wedge in said wave guide to attain phase relationship between functions of said line source means and said point sources.

6. In a spherical reflector and composite illuminator therefor the combination of: a spherical reflector; first means for supporting source means in the proximity of the paraxial focal point of said reflector, a line source means supported by said first means in alignment with said paraxial focal point and disposed to correct for spherical aberration of said reflector outwardly of its paraxial region; and a plurality of point sources supported by said first means in symmetrically spaced relation to said paraxial focal point and having a common center coinciding therewith, said first means pivotally mounted about the center of said reflector whereby said line source means and said point sources may be moved relative to said reflector to permit scanning while the reflector is stationary.

7. In a composite illuminator for spherical reflectors the combination of: a hollow wave guide casing having a pair of line source elements at a first end thereof, a first plane power divider in said casing and separating said line source elements to provide an equal division of power therebetween; a plurality of point source means in said wave guide casing and having radiating portions directed toward said first end; and second plane power divider in said casing disposed to provide a division of power between said line source elements and said point source means, said line source elements and said point source means disposed to have a common focal point communicating with said wave guide casing and adapted to coincide with the paraxial focal point of a spherical reflector.

8. In a spherical reflector and composite illuminator therefor the combination of: a spherical reflector; first means for supporting source means in the proximity of the paraxial forcal point of said reflector, a line source means supported by said first means in alignment with said paraxial focal point and disposed to correct for spherical aberration of said reflector outwardly of its paraxial region; and a plurality of point sources supported by said first means in symmetrically spaced relation to said paraxial focal point and having a common center coinciding therewith, said first means comprising a hollow wave guide casing having power divider partitions therein and disposed to provide a division of power between said line source means and said point sources.

9. In a composite illuminator for spherical reflectors the combination of: a hollow wave guide casing; a first pair of spaced power divider partitions therein separating said casing into three sections in one plane; a second power divider partition disposed transversely of said first pair of spaced power divider partitions, said second power divider partitions separating each of said three sections into a pair of sections; a pair of line source elements communicating with said pair of sections in the middle one of said three sections; said line source elements projecting at one end of said casing and having a common focal point; and a point source means communicating with each one of said pairs of sections in the two remaining sections of said three sections, all of said point source means projecting from said one end of said casing and having a composite focal point which coincides with the effective phase focus of said line source elements, said power divider partitions disposed to divide power between said line source elements and said point source means.

10. In a composite illuminator for spherical reflectors the combination of: a hollow wave guide casing; a first pair of spaced power divider partitions therein separating said casing into three sections in one plane; a second power divider partition disposed transversely of said first pair of spaced power divider partitions, said second power divider partition separating each of said three sections into a pair of sections; a pair of line source elements, communicating with said pair of sections in the middle one of said three sections; said line source elements projecting at one end of said casing and having a common focal point; and a point source means communicating with each of said pairs of sections in the two remaining sections of said three sections, all of said point source means projecting from said one end of said casing and having a composite focal point which coincides with the effective phase focus of said line source elements, said power divider partitions disposed to divide power between said line source elements and point source means, said line source elements being a pair of channel guides disposed back to back and said point source means each being a tapered polyrod.

11. In a composite illuminator for spherical reflectors the combination of: a hollow wave guide casing; a first pair of spaced power divider partitions therein separating said casing into three sections in one plane; a second power divider partition disposed transversely or said first pair of spaced power divider partitions, said second power divider partitions separating each of said three sections into a pair of sections; a pair of line source elements communicating with said pair of sections in the middle one of said three sections, said line source elements projecting at one end of said casing and having a common center; and a point source means communicating with each one of said pairs of sections in the two remaining sections of said three sections, all of said point source means projecting from said one end of said casing and having a composite focal point which coincides with the effective phase focus of said line source elements, said power divider partitions disposed to divide power between said line source elements and said point source means, said line source elements being a pair of channel guides disposed back to back, and said point source means each being a tapered polyrod, said point source means being spaced symmetrically about the common focal point of said channel guides and spaced apart approximately one half a wave length.

12. In a composite illuminator for spherical reflectors the combination of: a hollow wave guide casing; a first pair of spaced power divider partitions therein separating said casing into three sections in one plane; a second power divider partition disposed transversely of said first pair of spaced power divider partitions, said second power divider partition separating each of said three sections into a pair of sections, a pair of line source elements communicating with said pair of sections into the middle one of said three sections; said line source elements projecting at one end of said casing and having a common focal point; and a point source means communicating with each one of said pairs of sections in the two remaining sections of said three sections, all of said point source means projecting from said one end of said casing and having a composite focal point which coincides with the effective phase focus of said line source elements, said power divider partitions disposed to divide power between said line source elements and said point source means, said line source elements being a pair of channel guides disposed back to back and said point source means each being a tapered polyrod, said point source means being spaced symmetrically about the common focal point of said channel guides and spaced apart approximately one half a wave length; and dielectric wedges in said pair of sections in the middle one of said three sections to synchronize phase between the functions of said line source elements and said point source means.

13. In a spherical reflector and composite illuminator therefor the combination of: a spherical reflector; first means for supporting source means in the proximity of the paraxial focal point of said reflector, a line source means supported by said first means in alignment with said paraxial focal point and disposed to correct for spherical abberation of said reflector outwardly of its paraxial region; and a point source means supported by said first means adjacent to said paraxial focal point and having a center coinciding therewith.

References Cited in the file of this patent

UNITED STATES PATENTS

| | | |
|---|---|---|
| 2,605,419 | Van Atta | July 29, 1952 |
| 2,646,506 | Chu | July 21, 1953 |
| 2,677,055 | Allen | Apr. 27, 1954 |
| 2,814,038 | Miller | Nov. 19, 1957 |

FOREIGN PATENTS

| | | |
|---|---|---|
| 898,352 | France | July 3, 1944 |
| 1,021,632 | France | Dec. 3, 1952 |